United States Patent [19]
Kobayashi et al.

[11] Patent Number: 5,824,427
[45] Date of Patent: Oct. 20, 1998

[54] MAGNETIC RECORDING MEDIA AND METHODS FOR PRODUCING THE SAME

[75] Inventors: Masato Kobayashi, Tokyo; Keiji Moroishi; Jun-ichi Horikawa, both of Yamanashi; Osamu Nozawa, Tokyo, all of Japan

[73] Assignee: Hoya Corporation, Tokyo, Japan

[21] Appl. No.: 673,754

[22] Filed: Jun. 27, 1996

[30] Foreign Application Priority Data

Jun. 28, 1995 [JP] Japan ..................... 7-161941

[51] Int. Cl.⁶ .............. C23C 14/34; G11B 5/62; G11B 5/64
[52] U.S. Cl. ............. 428/694 TS; 428/694 TC; 428/694 TR; 428/694 ST; 427/128; 204/192.1
[58] Field of Search ............ 428/694 T, 694 TS, 428/694 TP, 694 TR, 64.1, 64.2, 65.3, 65.7, 694 TC, 694 ST; 369/283, 272, 288; 204/192.1, 192.32; 427/128, 132

[56] References Cited

U.S. PATENT DOCUMENTS

| | | | |
|---|---|---|---|
| 4,833,020 | 5/1989 | Shiroishi et al. | 428/336 |
| 4,939,045 | 7/1990 | Yoshida et al. | 428/664 |
| 5,242,762 | 9/1993 | Kouchiyama et al. | 428/694 T |
| 5,413,873 | 5/1995 | Mizakami et al. | 428/611 |
| 5,456,978 | 10/1995 | Lal et al. | 428/332 |
| 5,580,667 | 12/1996 | Lal et al. | 428/610 |
| 5,626,943 | 5/1997 | Tenhover | 428/141 |

*Primary Examiner*—John J. Zimmerman
*Assistant Examiner*—Michael LaVilla
*Attorney, Agent, or Firm*—Burns, Doane, Swecker & Mathis, L.L.P.

[57] ABSTRACT

A magnetic recording medium comprising a non-magnetic underlayer and a CoPt magnetic layer provided on a substrate in this order wherein the non-magnetic underlayer comprises one or more non-magnetic layers, one of the non-magnetic layers which is in contact with the CoPt magnetic layer consists mainly of Cr and Mo, and difference ($d_{(002)}-d_{(110)}$) obtained by subtracting a crystalline lattice spacing of bcc (110) faces in the non-magnetic layer consisting mainly of Cr and Mo from a crystalline lattice spacing of hcp (002) faces in the magnetic layer falls within a range of from 0.002 to 0.032 Å, which shows a high magnetic coercive force and square ratio and a low medium noise, and a method for producing the magnetic recording medium mentioned above wherein at least the non-magnetic layer consisting mainly of Cr and Mo and the CoPt magnetic layer are formed by a sputtering technique using a substrate heating temperature within a range of 250° to 425° C. and an Ar gas pressure within a range of 0.5 to 10 mTorr.

9 Claims, 2 Drawing Sheets

MAGNETIC RECORDING MEDIA AND METHODS FOR PRODUCING THE SAME

BACKGROUND OF THE INVENTION

The present invention relates to magnetic recording media such as magnetic disks and magnetic tapes and method for producing the same.

Recently, much attention has been paid to magnetic recording media having thin magnetic metal films produced by sputtering or vacuum deposition techniques as magnetic layers. The main reason why those thin magnetic metal films are paid much attention for magnetic recording media is, as well known in the art, that they can realize higher recording densities compared with prior materials having coated magnetic powder. It has been known that Co-containing alloys can exhibit good magnetic coercive force and squareness ratio as magnetic materials for such thin magnetic metal films. In particular, CoPt alloy thin layers have recently been paid much attention for industrial purpose as materials capable of realizing a higher recording density because they show a high magnetic coercive force and residual flux density.

Meanwhile, in magnetic recording media comprising magnetic layers of CoNiCr alloys, CoCrTa alloys or the like, underlayers of Cr have been known to be able to provide a high magnetic coercive force (see, for example, IEEE TRANSACTION ON MAGNETICS VOL. MAG-3, NO. 3 (1967), p. 205–507).

However, when CoPt alloy magnetic layers are used, underlayers composed of a sole component of Cr disadvantageously deteriorate C-axis orientation. Lattice constants of CoPt alloy magnetic layers are larger than crystalline lattice constants of magnetic layers composed of CoNiCr alloys, CoCrTa alloys and the like because of the larger atomic radius of Pt. Therefore, their conformity with the underlayers composed of a sole component of Cr in terms of atomic arrangement is deteriorated and as a result the C-axis orientation is deteriorated.

As a means for solving this problem, it has been proposed that a second metal (dissimilar metal) is added to the Cr underlayers to make crystalline lattice constants larger. By utilizing Cr alloy (such as CrV) underlayers where a dissimilar metal is added to change the lattice constant of the alloy underlayers, the C-axis orientation in the layers can be improved to enhance magnetic coercive force and squareness ratio (Japanese Patent Publication [KOKOKU] No. 4-16848).

However, the present inventors' study revealed that medium noise, which is another important property among the magnetic properties, is sharply increased by the addition of a dissimilar metal to the Cr underlayers.

Therefore, an object of the present invention is to provide magnetic recording media comprising a Cr alloy underlayer and a CoPt alloy magnetic layer and showing a low medium noise and methods for producing them.

Further, another object of the present invention is to provide magnetic recording media comprising a Cr alloy underlayer and a CoPt alloy magnetic layer and showing a high magnetic coercive force, squareness ratio and low medium noise, and methods for producing them.

As a result of the present inventors' extensive research, it was found that, through transmission electron microscopy, ununiformity of crystalline particle size and reduction of crystallinity of the Cr underlayers are caused by adding dissimilar metals such as Mo to the Cr underlayers. That is, it was found that, since growth of the CoPt alloy magnetic layer such as CoPtCr laminated on the Cr alloy underlayer is strongly influenced by particle sizes and crystallinity of the underlayer, ununiform particle sizes and bad crystallinity of the Cr underlayer result in ununiform crystalline particle sizes and markedly bad crystallinity of the magnetic layer, which thus increase medium noise.

Based on the above, it was experimentally observed that when a layer comprising a Cr alloy obtained by adding a dissimilar metal to Cr was laminated on a layer having uniform crystalline particle size and good crystallinity, uniform crystalline particle size and good crystallinity of the Cr alloy layer were obtained. However, using two layers for the underlayer as described above still could not reduce medium noise sufficiently.

Therefore, further research was conducted and it was found that medium noise can be markedly reduced by adjusting the crystalline lattice spacing of (002) faces in the CoPt alloy magnetic layer to the crystalline lattice spacing of (110) faces in the top layer of the underlayer, i.e., the Cr alloy (Cr added with dissimilar metals) underlayer. That is, by making small the difference between the crystalline lattice spacing of (002) faces in the CoPt alloy magnetic layer and the crystalline lattice spacing of (110) faces in the top layer of the underlayer, i.e., the Cr alloy layer, medium noise can be reduced while magnetic coercive force and squareness ratio are simultaneously improved.

Further, from a plenty of experiments, it has been revealed that absence of the difference between the crystalline lattice spacing of (002) faces in the CoPt alloy magnetic layer and the crystalline lattice spacing of (110) faces in the Cr alloy layer is not desirable and presence of a certain difference is preferred to reduce the noise. That is, medium noise is reduced by controlling the C-axis orientation of the magnetic layer within a certain range.

SUMMARY OF THE INVENTION

The present invention relates to magnetic recording media comprising a non-magnetic underlayer and a CoPt magnetic layer provided on a substrate in this order wherein the non-magnetic underlayer comprises one or more non-magnetic layers, one of the non-magnetic layers which is in contact with the CoPt magnetic layer consists mainly of Cr and Mo, and difference ($d_{(002)}-d_{(110)}$) obtained by subtracting a crystalline lattice spacing of bcc (110) faces in the non-magnetic layer consisting mainly of Cr and Mo from a crystalline lattice spacing of hcp (002) faces in the magnetic layer falls within a range of from 0.002 to 0.032 Å.

The present invention further relates to methods for producing magnetic recording media according to the present invention mentioned above wherein at least the non-magnetic layer consisting mainly of Cr and Mo and the CoPt magnetic layer are formed by a spattering technique using a substrate heating temperature within a range of 250° to 425° C. and an Ar gas pressure within a range of 0.5 to 10 mTorr.

DETAILED DESCRIPTION OF THE INVENTION

Figure 1:
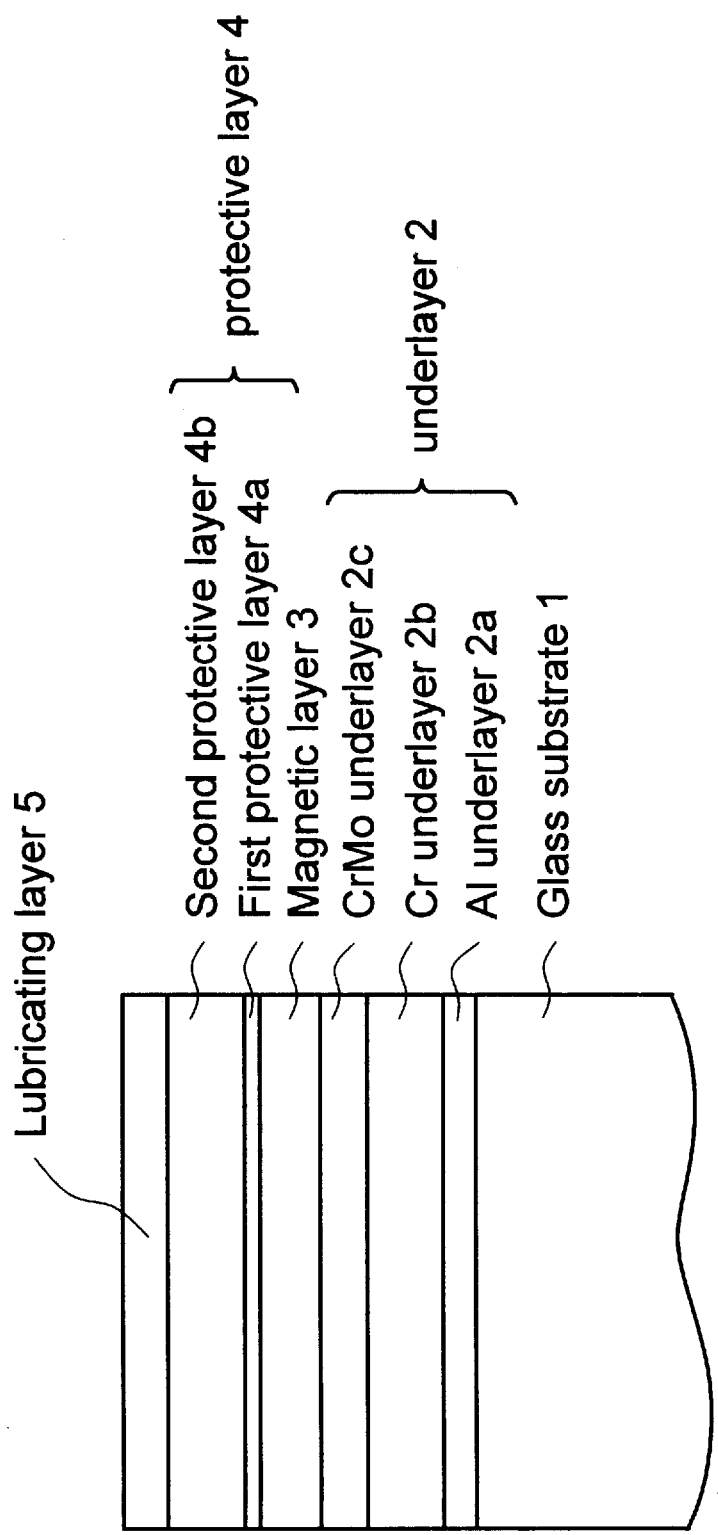
FIG. 1 is a partial cross sectional view of a magnetic disk of the present invention.

The present invention will be further explained in detail hereinafter.

The magnetic layer of the magnetic recording media according to the present invention is composed of a CoPt alloy, i.e., an alloy consisting mainly of Co and Pt. The alloy consisting mainly of Co and Pt preferably contains 70 at % (atomic percent) or more of Co and Pt in total in order to obtain a sufficient magnetic coercive force. Though ratio of Co and Pt is not particularly limited, the ratio Pt(at %)/Co(at %) is preferably within a range of 0.07 to 0.2 in view of magnetic coercive force, noise and cost.

Components other than Co and Pt are not particularly limited and one or more components may be selected from the group of Cr, Ta, Ni, Si, B, O, N, Nb, Mn, Mo, Zn, W, Pb, Re, V, Sm and Zr. The amount of these elements may desirably be decided in view of magnetic characteristics and the like and, in general, it is suitably equal to 30 at % or less. More specifically, CoPtCr alloys, CoPtTa alloys, CoPtCrB alloys, CoPtCrTa alloys, CoPtCrNi alloys and the like can be mentioned as examples of the materials of the magnetic layers.

Thickness of the CoPt alloy magnetic layer may be, for example, suitably in a range of 400 to 550 Å in view of output, overwriting properties and noise. When it is blow 400 Å, sufficient output may not be obtained and, when it exceeds 550 Å, there would be tendencies that the output is lowered, the overwriting characteristics are deteriorated and the medium noise is increased.

The magnetic recording media of the present invention comprise a non-magnetic underlayer composed of one or more non-magnetic layers. Among the non-magnetic layers, one which is contacted with the CoPt magnetic layer is composed of a material mainly consisting of Cr and Mo. This non-magnetic layer will be referred to as the "CrMo non-magnetic layer" hereinafter.

When the CrMo non-magnetic layer is composed solely of Cr and Mo, it is preferred that the amount of Mo added to Cr metal is equal to or less than 40 at % because such an amount can provide a layer showing uniform crystalline particle diameters and good crystallinity.

The CrMo non-magnetic layer may contain, instead of a part of Mo, one or more other elements selected from Zr, W, B, V, Nb, Ta, Fe, Ni, Re, Ce, Zn, P, Si, Ga, Hf, Al, Ti and the like. The total amount of Mo and these elements is preferably equal to or less than 40 at % because such an amount can provide a layer showing uniform crystalline particle diameters and good crystallinity.

However, amounts of Mo and other elements added to Cr may desirably be adjusted depending on contents of Co and Pt as well as contents and kinds of other elements contained in the magnetic layers.

For example, when the CoPtCr alloy magnetic layer has a Pt content of 4 to 20 at % and Cr content of 3 to 30 at % and the CrMo non-magnetic layer is composed of CrMo, the CrMo non-magnetic layer preferably has a Mo content of 2 to 20 at %. This is because such a Mo content yields uniform crystalline particle size and good crystallinity of the magnetic layer and the CrMo non-magnetic layer, and it makes it easy to control the difference of crystalline lattice constant of the CrMo non-magnetic layer and the magnetic layer within a suitable range. Particularly preferred Mo content for obtaining a high Hc and high S/N ratio is 5 to 10 at %.

Thickness of the CrMo non-magnetic layer may suitably be in a range of 10 to 150 Å. The upper and lower limits of the thickness of the CrMo non-magnetic layer are decided so that a layer having a uniform crystalline particle size and good crystallinity as well as a crystalline lattice spacing matched with that of the magnetic layer should be obtained. In view of these factors, thickness of the CrMo non-magnetic layer is preferably in a range of 20 to 100 Å.

CoMoZr alloys are preferably used as the CrMo non-magnetic layer to obtain a high Hc, Mr $\delta$ and S/N ratio, since addition of Zr to CrMo alloys further enhance the noise reduction effect and hence the S/N ratio is improved. To obtain this effect, a Zr content within a range of 2 to 5 at % is preferably employed.

This effect is influenced also by thickness of the layer and thickness of the CrMoZr non-magnetic layer may be in a range of 10 to 150 Å, preferably in a range of 20 to 100 Å. When it is blow 10 Å, sufficient Hc may not be obtained and, when it exceeds 150 Å, there would be tendencies that output is lowered, overwriting properties are deteriorated and medium noise is increased.

In the magnetic recording media of the present invention, difference ($d_{(002)}-d_{(110)}$) obtained by subtracting a crystalline lattice spacing of bcc (110) faces in the CrMo non-magnetic layer from a crystalline lattice spacing of hcp (002) faces in the magnetic layer falls within a range of 0.002 to 0.032 Å. When the difference ($d_{(002)}-d_{(110)}$) is below 0.002 Å or exceeds 0.032 Å, Hc and S/N ratio are lowered. Further, to obtain a further higher S/N ratio, the difference ($d_{(002)}-d_{(110)}$) preferably falls within a range of 0.014 to 0.030 Å.

The magnetic recording media of the present invention may further comprise one or more non-magnetic layers between the CrMo non-magnetic layer and the substrate. The non-magnetic layer which is in contact with the CrMo non-magnetic layer is preferably composed of a metal having a body-centered cubic close-packed crystalline structure. An example of the non-magnetic layer composed of a metal having a body-centered cubic close-packed crystalline structure is a Cr underlayer. The non-magnetic layer which is in contact with the CrMo non-magnetic layer is preferably a metal layer having a uniform particle size and good crystallinity, and it was experimentally confirmed that the most preferred is a Cr layer. Examples of metals having a body-centered cubic close-packed crystalline structure other than Cr include Ti, Ta and Zr.

Thickness of the non-magnetic layer composed of a metal having a body-centered cubic close-packed crystalline structure may suitably be in a range of 100 to 1000 Å. The upper and lower limits of thickness of the non-magnetic layer are decided so that the layer should have a uniform particle size and good crystallinity. In particular, in order to obtain a high Hc and S/N ratio, thickness of the non-magnetic layer is preferably in a range of 100 to 800 Å. Further, ratio of [thickness of the CrMo non-magnetic layer]/[thickness of the non-magnetic layer composed of a metal having a body-centered cubic close-packed crystalline structure] is preferably in a range of 0.05 to 0.5 since such a ratio provides a high Hc and S/N ratio.

In the magnetic recording media of the present invention, other non-magnetic layers may further be provided between the non-magnetic layer composed of a metal having a body-centered cubic close-packed crystalline structure and the non-magnetic substrate. Examples of such non-magnetic layers include Al, Ti and Zr layers. Thickness of these non-magnetic layers may be, for example, in a range of 10 to 100 Å. The upper and lower limits of the thickness of the non-magnetic layer are decided so that the non-magnetic layer composed of a metal having a body-centered cubic close-packed crystalline structure, which is laminated on the non-magnetic layer, should have a uniform particle size and good crystallinity. Further, to obtain a further higher Hc and S/N ratio, the thickness is preferably in a range of 30 to 80 Å.

The magnetic recording media of the present invention may comprise a protective layer and a lubricating layer provided on the CoPt alloy magnetic layer.

The protective layer is provided on the magnetic layer (surface opposite to the substrate) in order to protect the magnetic layer from chemical attack of moisture and the like, or to protect the magnetic layer from destruction due to sliding movement of heads contacting with the magnetic layer. The protective layer may be constituted by one or more layers composed of different materials. In the magnetic recording media of the present invention, material and structure of the protective layer are not particularly limited. In terms of material, exemplary protective layers include metal layers such as Cr layers for chemical protection and silicon oxide layers, carbon layers, zirconia layers, hydrogenated carbon layers, silicon nitride layers, SiC layers and the like for imparting wear resistance.

The lubricating layer is provided to reduce frictional resistance against sliding heads, and materials for making it are not particularly limited. For example, perfluoropolyethers and the like can be mentioned.

Material and shape of the substrate are not particularly limited so long as it is a non-magnetic substrate. For example, glass substrates, crystallized glass substrates, aluminium substrates, ceramic substrates, carbon substrates, silicon substrates and the like may be used.

The magnetic recording media of the present invention may be manufactured by utilizing conventional techniques for forming thin films such as sputtering techniques. In particular, by adjusting compositions of the CrMo non-magnetic layer and adjusting preparation conditions of the CrMo non-magnetic layer and the CoPt magnetic layer, magnetic recording media having differences of crystalline lattice spacings ($d_{(002)}-d_{(110)}$) within the desired range can be obtained.

For example, by forming at least the CrMo non-magnetic layer and the CoPt magnetic layer through a spattering technique under conditions of a substrate heating temperature within a range of 250° to 425° C. and an Ar gas pressure within a range of about 0.5 to 10 mTorr, magnetic recording media having differences of crystalline lattice spacings ($d_{(002)}-d_{(110)}$) within the desired range can be obtained. The substrate heating temperature is preferably within a range of 300° to 400° C. The Ar gas pressure is preferably in a range of 1 to 8 mTorr.

Since the magnetic recording media of the present invention show reduced medium noise, high magnetic coercive force and high squareness ratio, they are useful for magnetic disks, magnetic tapes and the like.

DESCRIPTION OF PREFERRED EMBODIMENTS

The magnetic recording media of the present invention will be further explained by referring to the following working examples and comparative examples hereinafter.

EXAMPLE 1

The magnetic recording medium of this example was a magnetic disk consisting of, as shown in FIG. 1, an underlayer 2, magnetic layer 3, protective layer 4 and lubricating layer 5, which were laminated on a glass substrate 1 in that order.

The glass substrate 1 was composed of an aluminosilicate glass and its surface had been ground as a mirror surface so that it should have an Ra of about 50 Å.

The underlayer 2 consisted of, from the side of the glass substrate 1, Al film 2a (thickness; 50 Å), Cr film 2b (thickness; 600 Å) and CrMo film 2c (thickness; 50 Å). The CrMo film 2c was composed of 98 at % of Cr and 2 at % of Mo.

The magnetic layer 3 was composed of a CoPtCr alloy and had a thickness of 500 Å. Co, Pt and Cr contents of the CoPtCr magnetic layer 3 were 78 at %, 11 at % and 11 at %, respectively.

The protective layer 4 consisted of, from the side of the substrate, a first protective layer 4a and second protective layer 4b. The first protective layer 4a was composed of a Cr film having a thickness of 50 Å and acted as a chemical protection layer for the magnetic layer. The other second protective layer 4b was composed of a silicon oxide film having a thickness of about 160 Å, in which hard microparticles are dispersed, and wear resistance was provided by this second protective layer 4b.

The lubricating layer 5 was composed of perfluoropolyether and direct contact of the medium with magnetic heads was obviated by this layer.

A process utilized for producing the above magnetic disk will be explained hereinafter.

Figure 2:
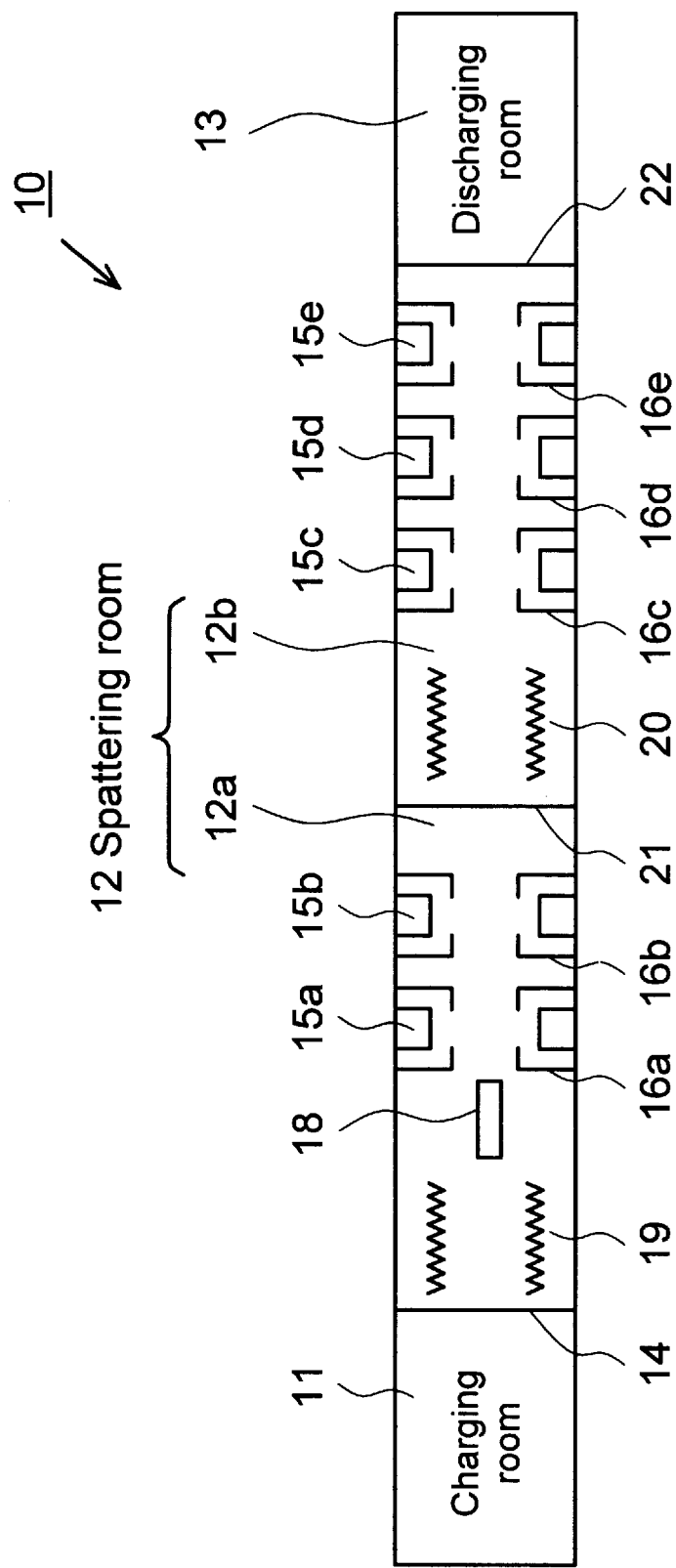
FIG. 2 is a schematic view of the inline type spattering machine used in the working examples described herein.

The glass substrate described above was mounted on a substrate holder (pallet), the pallet 18 was introduced into a charging room 11 of an inline spattering apparatus 10 shown in FIG. 2 and then the inside of the charging room 11 was evacuated from atmospheric pressure to a degree of vacuum similar to that of a spattering room (vacuum chamber) 12. Then, a partition 14 was opened and the pallet 18 was introduced into a first vacuum chamber 12a. In this first vacuum chamber 12a, the glass substrate mounted on the pallet 18 was heated to 300° C. for 1 minute by a lamp heater 19, and the pallet 18 was transferred at a speed of 1.2 m/minute between facing targets 15a and 16a and between facing targets 15b and 16b in discharging state successively at an Ar gas pressure of 5 mTorr. The targets consisted of Al and Cr in this order in the transferring direction and the Al layer 2a and the Cr layer 2b were formed on both sides of the glass substrate in this order according to the order of the targets. Sputtering was carried out at input powers of 300 W for the Al targets and 1.5 kW for the Cr targets.

Then, the pallet 18 was transferred to a second vacuum chamber 12b through a port 21, and the substrate was heated again by a heater 20 provided in the second vacuum chamber 12b. The heating was performed at 375° C. for 1 minute. Then, the pallet 18 was passed between discharging targets 15c and 16c to 15e and 16e, which were consisted of CrMo targets 15c and 16c, CoPtCr targets 15d and 16d and Cr targets 15e and 16e arranged in this order, at a transferring speed of 1.2 m/minute successively at an Ar gas pressure of 1.3 mTorr. As a result, the CrMo layer 2c, CoPtCr magnetic layer 3 and Cr first protective layer 4a were laminated according to the order of the aligned targets. Sputtering was carried out at input powers of 500 W for the CrMo targets, 1.2 kW for the CoPtCr targets and 500 W for the Cr targets. Final pressure (degree of vacuum) in the first and second vacuum chambers was less than $5 \times 10^{-6}$ Torr.

After the formation of films by the spattering described above, the first protective layer 4a was made hydrophilic by washing with IPA (isopropyl alcohol). Then the substrate was immersed into a solution of organosilicon compound (a mixture of water, IPA and tetraethoxysilane) in which silica microparticles (particle size; 100 Å) were dispersed, and sintered to form the second protective layer 4b composed of $SiO_2$.

Finally, the substrate was dipped into a lubricating agent comprising perfluoropolyether to form the lubricating layer 5 on the second protective layer 4b.

Good results were obtained in running test of the disk obtained above, which was carried out with a head flying height of less than 0.075 µm. Magnetic coercive force (Hc), residual magnetization film thickness product (Mr δ) and S/N ratio of the disk were evaluated. The results are shown in Table 1 together with the composition and the thickness of the CrMo layer 2c, the substrate heating temperature and the Ar gas pressure and difference ($d_{(002)}-d_{(110)}$) obtained by subtracting crystalline lattice spacing of (110) faces of the CrMo layer from that of (002) faces of the CoPtCr magnetic layer.

S/N ratio was evaluated as follows. A record reproducing output at a linear recording density of 80 kfci was determined utilizing a thin film head having a magnetic head flying height of 0.060 µm at a relative speed between the thin film head and the disk of 5.4 m/second. Further, noise spectra of the magnetic disk upon signal recording and reproducing were determined by a spectrum analyzer at a carrier frequency of 8.5 MHz and a measuring band of 20 MHz. The thin layer head used in this measurement had specifications of a coil turn number of 60, track width of 4.8 µm and magnetic head gap length of 0.25 µm.

EXAMPLES 2 TO 25

In Examples 2 to 22, magnetic disks were produced in a manner similar to that of Example 1 except that film composition and thickness of the CrMo layer 2c, substrate heating temperature and Ar gas pressure were changed as shown in Tables 1 and 2.

In Examples 23 to 25, magnetic disks were produced in a manner similar to that of Example 1 except that the CrMo layer 2c had a thickness of 50 Å and was composed of a CrMoZr alloy having a composition shown in Table 2.

Good results were obtained in running tests of the disks obtained above, which were carried out with a head flying height of less than 0.075 µm. Magnetic coercive force (Hc), residual magnetization film thickness product (Mr δ) and S/N ratio of the disks were evaluated. S/N ratios were determined by the same manner as in Example 1. The results are shown in Tables 1 and 2 together with the compositions and thicknesses of the CrMo layer 2c, substrate heating temperatures, Ar gas pressures and differences ($d_{(002)}-d_{(110)}$) obtained by subtracting a crystalline lattice spacing of (110) faces of the layer contacted with the CoPtCr magnetic layer from that of (002) faces of the CoPtCr magnetic layer.

Comparative Examples 1 to 6

In Comparative Example 1, a magnetic disk was produced in a manner similar to that of Example 1 except that the non-magnetic layer 2c was formed with Cr.

In Comparative Example 2, a magnetic disk was produced in a manner similar to that of Example 1 except the composition of the CrMo layer 2c.

In Comparative Examples 3 and 4, magnetic disks were produced in a manner similar to that of Example 1 except that substrate heating temperature and Ar gas pressure used for the production of the CrMo layer 2c were changed.

In Comparative Examples 5 and 6, magnetic disks were produced in a manner similar to that of Example 20 except that substrate heating temperature and Ar gas pressure used for the production of the CrMo layer 2c were changed.

Good results were obtained in running tests of the disks obtained above, which were carried out with a head flying height of less than 0.075 µm. Magnetic coercive force (Hc), residual magnetization film thickness product (Mr δ) and S/N ratio of the disks were evaluated. S/N ratio was determined by the same manner as in Example 1. The results are shown in Table 2 together with the compositions and thicknesses of the layer 2c, substrate heating temperatures, Ar gas pressure and differences ($d_{(002)}-d_{(110)}$) obtained by subtracting crystalline lattice spacing of (110) faces of the layer contacted with the CoPtCr magnetic layer from that of (002) faces of the CoPtCr magnetic layer.

TABLE 1

| Example | Composition of Magnetic Layer 3 (at %) | Composition of Layer 2c (at %) | Thickness of Layer 2c (Å) | Substrate Heating Temperature (°C.) | Ar Gas Pressure (mTorr) | Hc (Oe) | Mr δ (memu/cm²) | S/N ratio (dB) | $d_{(002)}-d_{(110)}$ (Å) |
|---|---|---|---|---|---|---|---|---|---|
| 1 | Co₇₈Pt₁₁Cr₁₁ | Cr₉₀Mo₂ | 50 | 375 | 1.3 | 1900 | 2.13 | 31.7 | +0.029 |
| 2 | " | " | 100 | " | " | 1950 | 2.07 | 31.9 | +0.028 |
| 3 | " | " | 50 | 300 | " | 1800 | 2.09 | 31.0 | +0.032 |
| 4 | " | " | " | 375 | 5.0 | 1850 | 2.11 | 31.3 | +0.032 |
| 5 | " | Cr₉₅Mo₅ | " | " | 1.3 | 2000 | 2.20 | 33.1 | +0.026 |
| 6 | " | " | 100 | " | " | 2050 | 2.11 | 33.3 | +0.025 |
| 7 | " | " | 20 | " | " | 1950 | 2.07 | 33.0 | +0.027 |
| 8 | " | " | 50 | 300 | " | 1900 | 2.11 | 32.3 | +0.029 |
| 9 | " | " | " | 375 | 5.0 | 1900 | 2.13 | 32.3 | +0.030 |
| 10 | " | Cr₉₀Mo₁₀ | " | " | 1.3 | 1950 | 2.20 | 32.7 | +0.015 |
| 11 | " | " | 100 | " | " | 2000 | 2.11 | 32.9 | +0.014 |
| 12 | " | " | 20 | " | " | 1950 | 2.05 | 32.8 | +0.016 |
| 13 | " | " | 50 | 300 | " | 1900 | 2.13 | 32.5 | +0.019 |
| 14 | " | " | " | 375 | 5.0 | 1900 | 2.11 | 32.3 | +0.021 |
| 15 | " | Cr₈₅Mo₁₅ | " | " | 1.3 | 1900 | 2.18 | 31.5 | +0.007 |
| 16 | " | " | 100 | " | " | 1950 | 2.24 | 31.6 | +0.008 |
| 17 | " | " | 20 | " | " | 1900 | 2.09 | 31.5 | +0.007 |
| 18 | " | " | 50 | 300 | " | 1800 | 2.13 | 31.1 | +0.013 |

TABLE 2

| Example | Composition of Magnetic Layer 3 (at %) | Composition of Layer 2c (at %) | Thickness of Layer 2c (Å) | Substrate Heating Temperature (°C) | Ar Gas Pressure (mTorr) | Hc (Oe) | Mr δ (memu/cm$^2$) | S/N ratio (dB) | $d_{(002)}-d_{(110)}$ (Å) |
|---|---|---|---|---|---|---|---|---|---|
| 19 | $Co_{78}Pt_{11}Cr_{11}$ | $Cr_{85}Mo_{15}$ | 50 | 375 | 5.0 | 1850 | 2.11 | 31.2 | +0.011 |
| 20 | " | $Cr_{80}Mo_{20}$ | " | " | 1.3 | 1900 | 2.13 | 31.3 | +0.002 |
| 21 | " | " | " | 300 | " | 1800 | 2.24 | 31.1 | +0.005 |
| 22 | " | " | " | 375 | 5.0 | 1850 | 2.20 | 31.2 | +0.004 |
| 23 | " | $Cr_{95}Mo_2Zr_3$ | " | " | 1.3 | 2020 | 2.23 | 33.8 | +0.028 |
| 24 | " | $Cr_{92}Mo_6Zr_2$ | " | " | " | 2100 | 2.25 | 34.3 | +0.025 |
| 25 | " | $Cr_{83}Mo_{12}Zr_5$ | " | " | " | 2050 | 2.20 | 33.8 | +0.016 |

| Comparative Example | Composition of Magnetic Layer 3 (at %) | Composition of Layer 2c (at %) | Thickness of Layer 2c (Å) | Substrate Heating Temperature (°C) | Ar Gas Pressure (mTorr) | Hc (Oe) | Mr δ (memu/cm$^2$) | S/N ratio (dB) | $d_{(002)}-d_{(110)}$ (Å) |
|---|---|---|---|---|---|---|---|---|---|
| 1 | $Co_{78}Pt_{11}Cr_{11}$ | Cr | 50 | 375 | 1.3 | 1650 | 1.89 | 28.5 | +0.035 |
| 2 | " | $Cr_{75}Mo_{25}$ | " | " | " | 1900 | 2.13 | 28.8 | -0.014 |
| 3 | " | $Cr_{98}Mo_2$ | " | 200 | " | 1750 | 2.20 | 28.8 | +0.035 |
| 4 | " | " | " | 375 | 20 | 1900 | 1.85 | 28.5 | +0.037 |
| 5 | " | $Cr_{80}Mo_{20}$ | " | 450 | 1.3 | 1950 | 1.80 | 28.3 | -0.004 |
| 6 | " | " | " | 375 | 0.2 | 1750 | 2.20 | 28.0 | -0.006 |

As seen from the results shown in Tables 1 and 2, the magnetic recording media of Examples 1 to 22 where the layer 2c was composed of a CrMo alloy showed higher magnetic coercive forces (Hc), residual magnetization film thickness products (Mr δ) and S/N ratios compared with the magnetic recording medium of Comparative Example 1 where the layer 2c was composed of Cr.

Further, the magnetic recording media of Examples 23 to 25 where the layer 2c was composed of a CrMoZr alloy showed higher magnetic coercive forces (Hc), residual magnetization film thickness products (Mr δ) and S/N ratios compared with the magnetic recording medium of Comparative Example 1 where the layer 2c was composed of Cr. In particular, S/N ratio was markedly improved when Zr was added to the CrMo alloys because the noise reduction effect was particularly enhanced by the addition of Zr to the CrMo alloys. It can be understood that the Zr content is preferably about 2 to 5 at % in order to obtain this effect.

Furthermore, by comparing the results of Examples 1 to 25 with those of Comparative Examples 2 to 6, it can be understood that the difference ($d_{(002)}-d_{(110)}$) obtained by subtracting crystalline lattice spacings of (110) faces of the layer contacting with the CoPt magnetic layer from that of (002) faces of the CoPt magnetic layer may vary depending on the composition of the layer 2c, the substrate heating temperature and the Ar gas pressure.

For example, the magnetic recording medium of Comparative Example 2 which had a Mo content in the CrMo alloy of the layer 2c of 25 at % showed the difference ($d_{(002)}-d_{(110)}$) of -0.014 and, as a result, showed a S/N ratio lower than those of the media of Examples 1 to 25.

These results indicate that, in order to obtain a difference ($d_{(002)}-d_{(110)}$) within the desired range of the present invention, the CrMo alloy of the layer 2c preferably has a Mo content of 2 to 20 at %.

Further, from the results of Comparative Examples 3 to 6, it can be understood that the ($d_{(002)}-d_{(110)}$) may significantly vary depending on the substrate heating temperature and the Ar gas pressure. It is assumed that this is caused because lattice distortions are generated in the films depending on their production conditions and these lattice distortions are variously deformed depending on the substrate heating temperature and the Ar gas pressure. This suggests that the ($d_{(002)}-d_{(110)}$) within the range of the present invention may be obtained by adjusting the Mo content of the CrMo layer 2c as well as the substrate heating temperature and the Ar gas pressure.

The magnetic recording media of Comparative Examples 3 and 4 and Example 1 were produced by using the same composition and film thickness of the layer 2c, while using different substrate heating temperatures and Ar gas pressures. In Comparative Example 3, because of the use of a lower substrate heating temperature, the ($d_{(002)}-d_{(110)}$) became 0.035 and, as a result, Hc and S/N ratio were lowered. In Comparative Example 4, because of the use of an increased Ar gas pressure, the ($d_{(002)}-d_{(110)}$) became 0.037 and, as a result, Mr δ and S/N ratio were lowered.

The magnetic recording media of Comparative Examples 5 and 6 and Example 20 were produced by using the same composition and film thickness of the layer 2c, while using different substrate heating temperatures and Ar gas pressures. In Comparative Example 5, because of the use of a higher substrate heating temperature, the ($d_{(002)}-d_{(110)}$) become -0.004 and, as a result, Mr δ and S/N ratio were lowered. In Comparative Example 6, because of the use of a lower Ar gas pressure, the ($d_{(002)}-d_{(110)}$) became -0.006 and, as a result, Hc and S/N ratio were lowered.

EXAMPLES 26 TO 43

In Examples 26 to 35, magnetic disks were produced in a manner similar to that of Example 1 except that the composition of the magnetic layer 3 and the CrMo composition of the layer 2c were changed.

In Examples 36 to 43, magnetic disks were produced in a manner similar to that of Example 1 except that the material and the composition of the magnetic layer 3 and the CrMo composition of the layer 2c were changed.

Good results were obtained in running tests of the disks obtained above, which were carried out with a head flying height of less than 0.075 μm. Magnetic coercive force (Hc), residual magnetization film thickness product (Mr δ) and S/N ratio of the disks were evaluated.

Measurement of S/N ratio was performed in the same manner as in Example 1. Results are shown in Table 3 together with the compositions of the magnetic layer 3, the compositions and the thicknesses of the CrMo layer 2c, the substrate heating temperatures, the Ar gas pressures and the differences ($d_{(002)}-d_{(110)}$) obtained by subtracting crystalline lattice spacings of (110) faces of the layer contacted with the CoPtCr magnetic layer from those of (002) faces of the CoPtCr magnetic layer.

Instead of Al underlayer film 2a, an aluminum (Al) or aluminum nitride (AlN) underlayer 2d with an uneven surface (cluster structure) is prepared by sputtering on a glass substrate 1. Then on the above uneven underlayer 2d, CrMo underlayer 2c and the magnetic layer 3 which are the same as those described in the above examples are laminated. On the magnetic layer 3, a protective layer composed

TABLE 3

| Example | Composition of Magnetic Layer 3 (at %) | Composition of Layer 2c (at %) | Thickness of Layer 2c (Å) | Substrate Heating Temperature (°C.) | Ar Gas Pressure (mTorr) | Hc (Oe) | Mr δ (memu/cm$^2$) | S/N ratio (dB) | $d_{(002)}-d_{(110)}$ (Å) |
|---|---|---|---|---|---|---|---|---|---|
| 26 | $Co_{84}Pt_5Cr_{11}$ | $Cr_{95}Mo_5$ | 50 | 375 | 1.3 | 1800 | 2.40 | 31.5 | +0.011 |
| 27 | " | $Cr_{90}Mo_{10}$ | " | " | " | 1800 | 2.42 | 31.1 | +0.003 |
| 28 | $Co_{71}Pt_{18}Cr_{11}$ | $Cr_{95}Mo_5$ | " | " | " | 2200 | 1.95 | 31.6 | +0.032 |
| 29 | " | $Cr_{90}Mo_{10}$ | " | " | " | 2250 | 1.96 | 32.5 | +0.024 |
| 30 | $Co_{84}Pt_{11}Cr_5$ | $Cr_{95}Mo_5$ | " | " | " | 1850 | 2.40 | 31.8 | +0.031 |
| 31 | " | $Cr_{90}Mo_{10}$ | " | " | " | 1900 | 2.41 | 32.3 | +0.022 |
| 32 | $Co_{74}Pt_{11}Cr_{15}$ | $Cr_{95}Mo_5$ | " | " | " | 2100 | 2.08 | 32.5 | +0.020 |
| 33 | " | $Cr_{90}Mo_{10}$ | " | " | " | 2150 | 2.07 | 31.6 | +0.010 |
| 34 | $Co_{64}Pt_{11}Cr_{25}$ | $Cr_{95}Mo_5$ | " | " | " | 2250 | 1.80 | 31.9 | +0.013 |
| 35 | " | $Cr_{90}Mo_{10}$ | " | " | " | 2800 | 1.81 | 31.1 | +0.003 |
| 36 | $Co_{87}Pt_{11}Ta_2$ | $Cr_{95}Mo_5$ | " | " | " | 1850 | 2.43 | 30.3 | +0.028 |
| 37 | " | $Cr_{90}Mo_{10}$ | " | " | " | 1900 | 2.45 | 30.9 | +0.020 |
| 38 | $Co_{84}Pt_{11}Ta_5$ | $Cr_{95}Mo_5$ | " | " | " | 1900 | 2.23 | 30.1 | +0.032 |
| 39 | " | $Cr_{90}Mo_{10}$ | " | " | " | 1900 | 2.22 | 30.8 | +0.024 |
| 40 | $Co_{76}Pt_{11}Cr_{11}Ta_2$ | $Cr_{95}Mo_5$ | " | " | " | 2000 | 2.00 | 33.0 | +0.028 |
| 41 | " | $Cr_{90}Mo_{10}$ | " | " | " | 1950 | 2.01 | 32.8 | +0.018 |
| 42 | $Co_{73}Pt_{11}Cr_{11}Ta_5$ | $Cr_{95}Mo_5$ | " | " | " | 2050 | 1.65 | 31.5 | +0.030 |
| 43 | " | $Cr_{90}Mo_{10}$ | " | " | " | 2000 | 1.66 | 31.8 | +0.021 |

As seen from the results of Examples 26 to 35 shown in Table 3, when a layer 2c composed of CrMo alloy having a Mo content of 5 to 10 at % and a magnetic layer composed of a CoPtCr alloy are used, a Co content of 60 to 90 at %, Pt content of 4 to 20 at % and Cr content of 3 to 30 at % can yield a high Hc and high S/N ratio. Further, to obtain a further higher Hc and S/N ratio, it is suitable to use a Co content of 64 to 84 at %, Pt content of 5 to 18 at % and Cr content of 5 to 25 at %.

Further, as seen from the results of Examples 36 to 39, a high Hc and high S/N ratio can be obtained by a CoPtTa alloy magnetic layer having a Co content of 80 to 90 at %, Pt content of 5 to 15 at % and Ta content of 1 to 7 at %.

Furthermore, as seen from the results of Examples 40 to 43, a high Hc and high S/N ratio can be obtained by a CoPtCrTa alloy magnetic layer having a Co content of 70 to 80 at %, Pt content of 5 to 15 at %, Cr content of 5 to 25 at % and Ta content of 1 to 7 at %.

According to the present invention, there can be provided magnetic disks showing more excellent magnetostatic properties such as magnetic coercive force and residual magnetization film thickness product, and recording and reproducing properties such as S/N ratio and OW compared with conventional magnetic disks comprising a Cr underlayer and CoPt alloy magnetic layer, and they show a high output and a small medium noise at a surface recording density exceeding 500 Mb/in$^2$.

In the above mentioned examples, the resulting disks have Cr first protective layer 4a and second protective layer 4b composed of $SiO_2$. Layer 4b makes the surface of the disk uneven so that the adsorption of a head to the surface of the disk is prevented.

In order to provide a disk with an uneven surface, the following texture technique is also applied to in the present invention.

of carbon is laminated by spattering in place of the above Cr first protective layer 4a and second protective layer 4b. Then lubricating layer 5 is prepared on the carbon protective layer.

The unevenness of the above underlayer 2d is reflected to each layer on it, and a disk with an uneven surface of lubricating layer 5 can be obtained and this uneven surface prevents a disk from adsorbing to a head.

What is claimed is:

1. A magnetic recording medium comprising a non-magnetic underlayer and a CoPt magnetic layer provided on a substrate in this order, wherein the CoPt magnetic layer is a magnetic layer consisting of an alloy comprising Co and Pt and wherein the non-magnetic underlayer comprises one or more non-magnetic layers, one of the non-magnetic layers which is in contact with the CoPt magnetic layer consists mainly of Cr and Mo, and difference ($d_{(002)}-d_{(110)}$) obtained by subtracting a crystalline lattice spacing of bcc (110) faces in the non-magnetic layer consisting mainly of Cr and Mo from a crystalline lattice spacing of hcp (002) faces in the magnetic layer falls within a range of from 0.002 to 0.032 Å.

2. The magnetic recording medium of claim 1 wherein the difference of lattice spacings ($d_{(002)}-d_{(110)}$) falls within a range of from 0.014 to 0.030 Å.

3. The magnetic recording medium of claim 1 wherein the medium comprises one or more non-magnetic layers between the non-magnetic layer consisting mainly of Cr and Mo and the substrate, and one of the non-magnetic layers which is in contact with the non-magnetic layer consisting mainly of Cr and Mo is composed of a metal having a body-centered cubic close-packed crystalline structure.

4. The magnetic recording medium of claim 3 wherein the non-magnetic layer composed of a metal having a body-centered cubic close-packed crystalline structure is a Cr layer.

5. The magnetic recording medium of claim 1 wherein the CoPt magnetic layer is a CoPtCr alloy layer or a CoPtCrTa alloy layer.

6. The magnetic recording medium of claim 5 wherein the CoPtCr alloy layer has a Co content of 60 to 90 at %, Pt content of 4 to 20 at % and Cr content of 3 to 30 at %.

7. The magnetic recording medium of claim 1 wherein the substrate is a glass substrate.

8. The magnetic recording medium of claim 1 wherein the non-magnetic underlayer is an uneven layer between the substrate and the magnetic layer, and a protective layer composed of carbon is provided on the magnetic layer.

9. A method for producing the magnetic recording medium of claim 1 wherein at least the non-magnetic layer consisting mainly of Cr and Mo and the CoPt magnetic layer are formed by a sputtering technique using a substrate heating temperature within a range of 250° to 425° C. and an Ar gas pressure within a range of 0.5 to 10 mTorr.

* * * * *